(12) United States Patent
Singh et al.

(10) Patent No.: US 11,811,773 B2
(45) Date of Patent: *Nov. 7, 2023

(54) PROVIDING ACCESS TO CONTENT WITHIN A COMPUTING ENVIRONMENT

(71) Applicant: Citrix Systems, Inc., Fort Lauderdale, FL (US)

(72) Inventors: Manbinder Pal Singh, Coral Springs, FL (US); Leo C. Singleton, IV, Fort Lauderdale, FL (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/355,857

(22) Filed: Jun. 23, 2021

(65) Prior Publication Data
US 2021/0320925 A1  Oct. 14, 2021

Related U.S. Application Data

(63) Continuation of application No. 16/180,721, filed on Nov. 5, 2018, now Pat. No. 11,082,429.

(51) Int. Cl.
| | | |
|---|---|---|
| *H04L 29/06* | (2006.01) | |
| *H04L 9/40* | (2022.01) | |
| *H04L 67/025* | (2022.01) | |
| *G06F 16/954* | (2019.01) | |
| *G06F 16/23* | (2019.01) | |

(Continued)

(52) U.S. Cl.
CPC ........ *H04L 63/101* (2013.01); *G06F 16/2379* (2019.01); *G06F 16/954* (2019.01); *G06F 16/9566* (2019.01); *G06F 16/9574* (2019.01); *H04L 67/025* (2013.01); *H04L 67/564* (2022.05); *G06F 9/452* (2018.02); *H04L 63/0236* (2013.01)

(58) Field of Classification Search
CPC ... H04L 63/101; H04L 67/025; H04L 67/564; H04L 63/0236; H04L 63/0245; H04L 67/131; G06F 16/2379; G06F 16/954; G06F 16/9566; G06F 16/9574; G06F 9/452

See application file for complete search history.

(56) References Cited

U.S. PATENT DOCUMENTS

| | | |
|---|---|---|
| 7,529,802 B2 | 5/2009 | Nelson et al. |
| 7,581,005 B2 | 8/2009 | Montemayor et al. |

(Continued)

OTHER PUBLICATIONS

Rouse, Margaret, "content filtering (information filtering)," SearchSecurity.com, TechTarget, Jan. 28, 2011, Copyright 2000-2020, https://searchsecurity.techtarget.com/definition/content-filtering, 1 page.

(Continued)

*Primary Examiner* — Harunur Rashid

(57) ABSTRACT

A technique provides access to content within a computing environment. The technique involves identifying a network address to a resource which is currently blocked from being accessed via the network address due to operation of a content filter. The technique further involves, based on previously accessed content, modifying the operation of the content filter to unblock access to the resource via the network address. The technique further involves, after the operation of the content filter is modified to unblock access to the resource via the network address, permitting access to the resource via the network address.

20 Claims, 6 Drawing Sheets

(51) Int. Cl.
*G06F 16/955* (2019.01)
*G06F 16/957* (2019.01)
*H04L 67/564* (2022.01)
*G06F 9/451* (2018.01)

(56) References Cited

U.S. PATENT DOCUMENTS

| | | | |
|---|---|---|---|
| 7,664,857 | B2 | 2/2010 | Ovsiannikov et al. |
| 7,774,834 | B1 | 8/2010 | Chauhan et al. |
| 7,962,558 | B2 | 6/2011 | Nelson et al. |
| 3,095,602 | A1 | 1/2012 | Orbach |
| 8,095,602 | B1* | 1/2012 | Orbach ............... G06Q 10/107 709/224 |
| 8,261,340 | B2 | 9/2012 | Chauhan et al. |
| 8,695,083 | B2 | 4/2014 | Chauhan et al. |
| 8,769,063 | B2 | 7/2014 | Barton et al. |
| 8,799,994 | B2 | 8/2014 | Barton et al. |
| 8,806,570 | B2 | 8/2014 | Barton et al. |
| 8,881,229 | B2 | 11/2014 | Barton et al. |
| 8,990,106 | B2 | 3/2015 | Parker et al. |
| 9,043,480 | B2 | 5/2015 | Barton et al. |
| 9,111,105 | B2 | 8/2015 | Barton et al. |
| 9,197,600 | B2 | 11/2015 | L'Heureux et al. |
| 9,213,850 | B2 | 12/2015 | Barton et al. |
| 9,521,147 | B2 | 12/2016 | Barton et al. |
| 9,942,198 | B2* | 4/2018 | Hoy .................. G06F 21/53 |
| 10,075,459 | B1* | 9/2018 | Suryanarayanan ........................ H04L 63/1441 |
| 10,601,780 | B2 | 3/2020 | Hoy et al. |
| 10,841,316 | B2 | 11/2020 | Innes et al. |
| 11,087,008 | B2 | 8/2021 | Borkar et al. |
| 2006/0123014 | A1 | 6/2006 | Ng |
| 2012/0023593 | A1* | 1/2012 | Puder ............... H04L 63/101 726/28 |
| 2017/0353463 | A1* | 12/2017 | Wu .................. G06F 21/6218 |
| 2017/0357480 | A1* | 12/2017 | La Placa ............ G06N 3/006 |
| 2019/0036930 | A1* | 1/2019 | Bartik ............... G06F 21/577 |

OTHER PUBLICATIONS

Techopedia, "Content Filtering," Techopedia.com, Sep. 26, 2012, https://www.techopedia.com/definition/14314/content-filtering, 2 pages.

* cited by examiner

PROVIDING ACCESS TO CONTENT WITHIN A COMPUTING ENVIRONMENT

CROSS REFERENCE TO RELATED APPLICATIONS

This application is a continuation of earlier-filed U.S. application Ser. No. 16/180,721, filed on Nov. 5, 2018 and entitled "Providing Access to Content within a Computing Environment", the contents and teachings of which are hereby incorporated by reference in their entirety.

BACKGROUND

In the context of a virtual desktop infrastructure (VDI), an application server delivers a virtual desktop environment to a group of user devices. The virtual desktop environment may include a variety of virtual desktop applications such as a web browser, an email client, a document editor, and so on.

The web browser for such a virtual desktop environment provides website access. Some web browsers are able to control access to websites (e.g., block or allow incoming advertisements).

SUMMARY

Improved techniques are directed to providing access to content within a computing environment. In accordance with certain embodiments, a user is able to operate a secure browser which is configured to allow access only to content from specified network addresses (e.g., universal resource locators or links within webpages) on a whitelist (e.g., a list of permitted network addresses). If the user directs the secure browser to access content from a network address that is not on the whitelist, the secure browser blocks access to that content. As the user navigates the secure browser through content, a specialized tool (e.g., specialized circuitry formed by one or more processors operating in accordance with specialized instructions) identifies new network addresses within that content and evaluates these newly identified network addresses as candidates for possible inclusion on the whitelist. In some arrangements, the specialized tool may detect new network addresses within content accessed by multiple users and may perform assessments on whether these new network addresses should be added to the whitelist (e.g., based on how many times the network addresses were detected, whether the users attempted to access content from the detected network addresses, whether the network addresses are on a public or private network, etc.). Accordingly, a human administrator does not need to wait for users to request addition of new network addresses to the whitelist in order to access content from the new network addresses. Rather, the specialized tool is able to detect network addresses even before the users have attempted access thus enabling proactive updating of the whitelist.

One embodiment is directed to a method of providing access to content within a computing environment. The method includes identifying a set of network addresses of a webpage, the webpage being associated with an application. Each of the set of network addresses is associated with content related to the application, and at least one of the set of network addresses is associated with content that is blocked. The method further includes generating a set of assessed values for the set of network addresses of the webpage based on assessment criteria, and configuring a content filter to allow access to the content associated with the at least one of the set of network addresses based on the set of assessed values.

In some arrangements, identifying the set of network addresses of the webpage involves discovering a set of universal resource locators (URLs) in the webpage, and updating web browsing data stored in a web browsing database in response to discovering the set of URLs in the webpage.

In some arrangements, the assessment criteria defines a URL scoring methodology. Additionally, generating the set of assessed values for the set of network addresses of the webpage includes applying the URL scoring methodology to the web browsing data stored in the web browsing database, and providing a set of URL scores, each of the set of URL scores indicating an amount of assessed significance for a respective URL of the set of URLs.

In some arrangements, configuring the content filter to allow access to the content associated with the at least one of the set of network addresses includes adding at least one URL of the set of URLs to a URL list. The content filter allows access to content from each URL on the URL list and denies access to content from each URL not on the URL list.

In some arrangements, the method further includes discovering URLs in other webpages, and updating the web browsing data stored in the web browsing database in response to discovering the URLs in the other webpages. Accordingly, the web browsing data may accumulate or aggregate over a period of time, e.g., a day, a week, since the last time a privileged user operated the specialized tool, based on specified absolute times, and so on.

In some arrangements, the URLs discovered in the other webpages includes other URLs that do not belong to the set of URLs. Additionally, the method further includes providing other URL scores, each of the other URL scores indicating an amount of assessed significance for a respective URL of the other URLs that do not belong to the set of URLs.

In some arrangements, the set of URL scores includes a first URL score indicating an amount of assessed significance for a first URL that belongs to the set of URLs, and the other URL scores include a second URL score indicating an amount of assessed significance for a second URL that belongs to the other URLs. The first URL score is higher than the second URL score to indicate a higher amount of assessed significance for the first URL than for the second URL. Additionally, adding the at least one URL of the set of URLs to the URL list includes placing the first URL on the URL list while concurrently omitting the second URL from the URL list to enable the content filter to provide access to content from the first URL while concurrently blocking content from the second URL.

In some arrangements, discovering the set of URLs in the webpage includes scanning the webpage for URLs in response to navigation to the webpage by a first user operating a first client device. Additionally, discovering the URLs in the other webpages includes scanning the other webpages for URLs in response to navigation to the other webpages by a second user operating a second client device that is different from the first client device.

In some arrangements, each of the first client device and the second client device receives a set of application services dynamically provided from a set of server devices through a computer network, the set of application services including a secure web browser service. Additionally, scanning the webpage for URLs in response to navigation to the webpage by the first user operating the first client device includes filtering the webpage for URLs while the set of server devices delivers the secure web browser service to the first client device operated by the first user. Furthermore, scanning the other webpages for URLs in response to navigation to the other webpages by the second user operating the second client device includes filtering the other webpages for URLs while the set of server devices delivers the secure web browser service to the second client device operated by the second user.

In some arrangements, the application is a project management tool that manages project data for a particular project and that is different from the content filter. Additionally, filtering the webpage for URLs includes loading the webpage from a website provided by the project management tool and scanning the webpage for URLs while the first user accesses the webpage using the first client device.

In some arrangements, discovering the set of URLs in the webpage includes scanning the webpage for URLs in response to navigation to the webpage by a user operating a client device. Additionally, discovering the URLs in the other webpages includes scanning the other webpages for URLs in response to navigation to the other webpages by the user operating the client device.

In some arrangements, adding the at least one URL to the URL list include ordering URLs of the set of URLs based on URL scores to form an order of URLs, and adding the URL that is ordered highest in the order to the URL list.

In some arrangements, each of the set of URL scores indicates a discovery frequency for a respective URL. Additionally, ordering the URLs of the set of URLs based on URL scores to form the order of URLs includes ranking the URLs from the URL that was discovered the most often to the URL that was discovered the least often.

In some arrangements, adding the URL that is ordered highest in the order to the URL list includes performing a comparison operation that compares a URL score corresponding to the URL that is ordered highest in the order to a predefined threshold and, in response to a result of the comparison operation, performing an inclusion operation to include the URL on the URL list.

In some arrangements, performing the inclusion operation to include the URL on the URL list includes providing a prompt on a user interface to a privileged user, the prompt informing the privileged user that the URL is recommended for inclusion on the URL list, receiving an inclusion command from the privileged user via the user interface, and adding the URL to the URL list in response to the inclusion command.

In some arrangements, performing the inclusion operation to include the URL on the URL list includes automatically adding the URL to the URL list in response to the result of the comparison operation indicating that the URL score corresponding to the URL exceeds the predefined threshold.

In some arrangements, each of the set of URL scores is based at least in part on how many times a navigation attempt was made to a respective URL. Additionally, ordering the URLs of the set of URLs based on URL scores to form the order of URLs includes ranking the URLs based on the set of URL scores.

In some arrangements, each of the set of URL scores is based at least in part on whether a respective URL is located on a private network or a public network. Additionally, ordering the URLs of the set of URLs based on URL scores to form the order of URLs includes ranking the URLs based on the set of URL scores.

Another embodiment is directed to electronic circuitry which includes a communications interface constructed and arranged to connect to a computer network, memory, and control circuitry coupled to the communications interface and the memory. The memory stores instructions that, when carried out by the control circuitry, cause the control circuitry to:

(A) identify a set of network addresses of a webpage, the webpage being associated with an application, each of the set of network addresses being associated with content related to the application, and at least one of the set of network addresses being associated with content that is blocked, (B) based on assessment criteria, generate a set of assessed values for the set of network addresses of the webpage, and (C) based on the set of assessed values, configure a content filter to allow access to the content associated with the at least one of the set of network addresses.

Yet another embodiment is directed to a computer program product having a non-transitory computer readable medium that stores a set of instructions to provide access to content within a computing environment. The set of instructions, when carried out by computerized circuitry, causes the computerized circuitry to perform a method of:

(A) identifying a set of network addresses of a webpage, the webpage being associated with an application, each of the set of network addresses being associated with content related to the application, and at least one of the set of network addresses being associated with content that is blocked;

(B) based on assessment criteria, generating a set of assessed values for the set of network addresses of the webpage; and (C) based on the set of assessed values, configuring a content filter to allow access to the content associated with the at least one of the set of network addresses.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved providing access to content within a computing environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing access to content within a computing environment. In accordance with certain embodiments, a user is able to operate a secure browser which is configured to allow access only to content from network addresses on a whitelist. If the user directs the secure browser to access content from a network address that is not on the whitelist, the secure browser blocks access to that content. As the user navigates the secure browser through content, a specialized tool identifies new network addresses within that content and evaluates these newly identified network addresses as candidates for possible inclusion on the whitelist. In some arrangements, the specialized tool may detect new network addresses within content accessed by multiple users and may perform assessments on whether these new network addresses should be added to the whitelist (e.g., based on occurrence/frequency, whether the users attempted to access content from the detected network addresses, whether the network addresses are on a public or private network, etc.). Accordingly, a human administrator does not need to wait for users to request inclusion of new network addresses on the whitelist in order to access content from the new network addresses. Rather, the specialized tool is able to proactively detect network addresses before the users have attempted access thus enabling updating of the whitelist without requiring the users to make manual requests.

In accordance with certain embodiments, the secure browser operates based on a designated set of network addresses which is referred to herein as a "whitelist" for convenience. This set of network addresses is readily accessible by the secure browser and may be updated over time (e.g., by a privileged human administrator, by a specialized tool, etc.). Additionally, the set of network addresses may be stored in and retrieved from a file, a database, an array, a linked list, another type and/or arrangement of data structures, combinations thereof, and so on. Furthermore, the set of network addresses may be maintained in persistent memory, cached, copied, distributed among different locations, etc.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
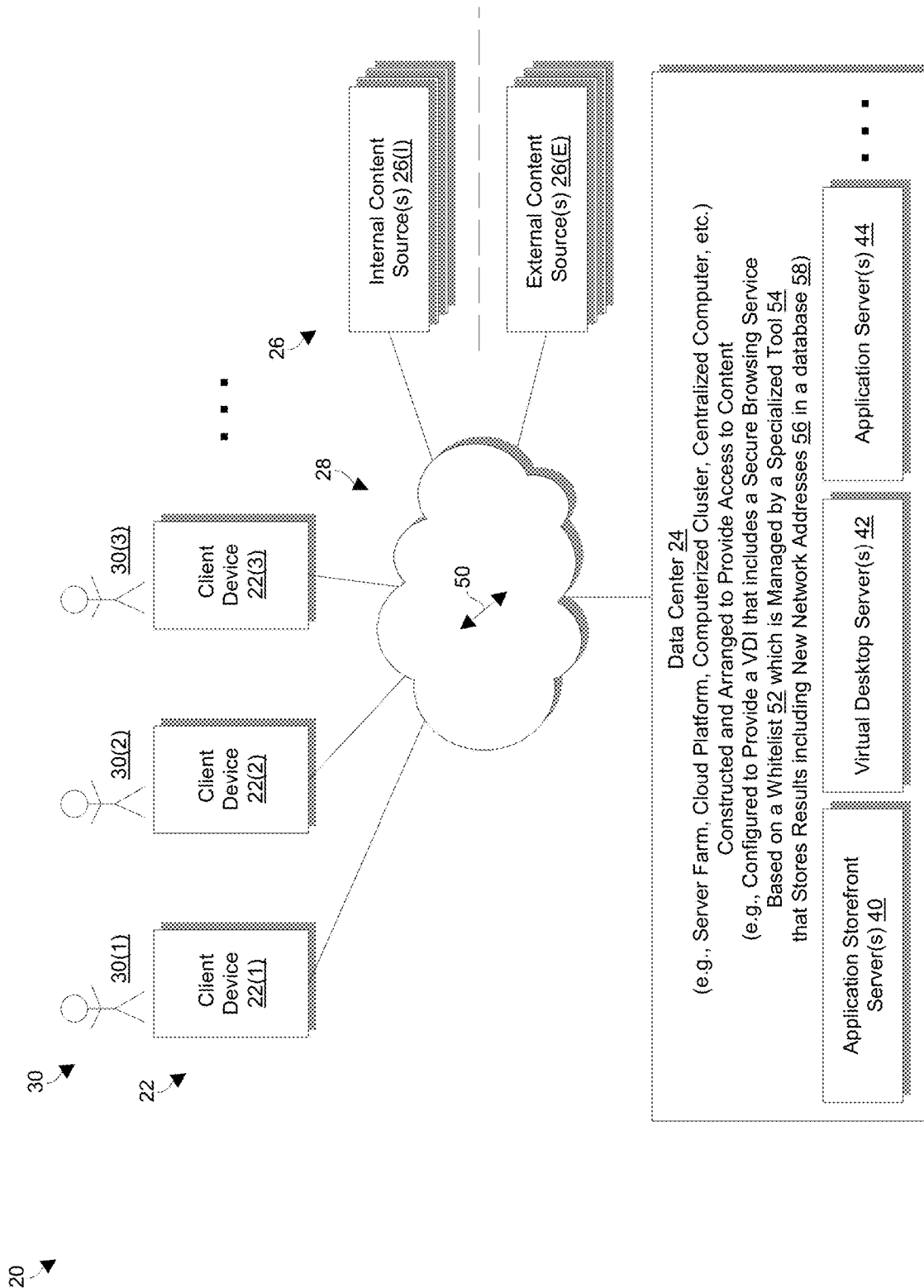
FIG. 1 is a block diagram of an example virtual desktop infrastructure (VDI) environment in accordance with certain embodiments.

FIG. 1 shows a computing environment 20 which provides access to content. The computing environment 20 includes client devices 22(1), 22(2), 22(3), . . . (collectively, client devices 22), a data center 24, content sources 26, and a communications medium 28.

Each client device 22 is operated by a respective user 30 and is constructed and arranged to perform useful work (e.g., access files/messages/emails/other data/etc., run applications, consume or provide electronic services, generate/edit/output content, etc.). Suitable electronic apparatus for the client devices 22 include desktop workstations, user computers, portable laptops, tablets, smart phones, and the like. Such apparatus are able to run local and/or remote applications, as well as electronically exchange information with other apparatus. As shown in FIG. 1, a user 30(1) operates client device 22(1), a user 30(2) operates client device 22(2), a user 30(3) operates client device 22(3), and so on.

The data center 24 includes specialized equipment that facilitates operation of the computing environment 20. Along these lines, the data center 24 may include application storefront server(s) 40 to provide access to a variety of applications and support to the client devices 22 (e.g., applications that enable the client devices 22 to participate in a virtual desktop infrastructure), virtual desktop server(s) 42 to provide virtual desktops and application services, other application server(s) 44 to provide other application services, and so on. Suitable equipment includes a server farm, a cloud platform, a computerized cluster, a centralized computer, etc. Such equipment may reside in one or more central locations (e.g., a single campus, a building, etc.), be distributed among different locations (e.g., different cities, states, coasts, etc.), or combinations thereof.

The content sources 26 are constructed and arranged to maintain content (e.g., webpages, video data, audio data, project data, etc.). Such content sources 26 may include internal content sources 26(I) (e.g., equipment which resides on a local or private computer network) as well as external content sources 26(E) (e.g., equipment which resides on an external or public computer network). The dashed line in FIG. 1 is intended to illustrate distribution of the content sources 26 among different locations (e.g., local area networks, wide area networks, the Internet, etc.).

The communications medium 28 is constructed and arranged to connect the various components of the computing environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting a variety of communications types such as Ethernet-based communications, cellular communications, plain old telephone service (POTS) communications, combinations thereof, and so on.

It should be understood that the computing environment 20 is well-suited for a virtual desktop infrastructure (VDI). For example, in accordance with certain embodiments, at least a portion of the computer environment 20 may belong to an organization that offers, among other things, one or more applications that are capable of performing content filtering as part of a virtual desktop or other application virtualization platform. Example applications include web browsers, firewalls, other applications that validate whether network addresses requested by users are allowed or not, combinations thereof, and so on.

In some situations, at least a portion of the computing environment 20 utilizes a virtualization platform that runs virtual machines (VMs) for scalability, load balancing, fault tolerance, etc. In some arrangements, one or more of the content sources 26 is co-located with the data center 24 (e.g., hosted on one or more data center servers).

During operation, the users 30 operate their respective client devices 22 to perform useful work. In accordance with certain embodiments, the various components of the data center 24 enable deployment and operation of a virtual desktop infrastructure (VDI). For example, an application storefront server 40 of the data center 24 distributes enabling applications to the client devices 22 to enable the client devices 22 to properly communicate with other VDI equipment to exploit application virtualization (e.g., to distribute client software that enables the client devices 22 to access virtual desktops and other applications that are hosted by the data center 24). Additionally, the virtual desktop servers of the data center 24 42 provide (or host) virtual desktops (e.g., a virtual desktop environment, a suite of desktop applications, etc.) for the client devices 22, the application servers 44 of the data center 24 provide other application virtualization, and so on.

It should be understood that the data center 24 may actually include multiple different data center locations or sites that host different applications. For example, web, software as a service (SaaS) applications/resources, and/or other cloud based services may be hosted from different data locations that are operated by different entities/organizations.

Among the services that may be provided within the VDI is a content filtering that provides or denies access to network locations depending on whether the addresses of the network locations reside on a whitelist 52 that is maintained by the data center 24. In particular, if a network address resides on the whitelist 52, the content filtering service grants access to content from the network location at that address. However, if a network address does not reside on the whitelist 52, the content filtering service denies access to content from the network location at that address. In accordance with some embodiments, such a content filtering service may be offered by the data center 24 to each client device 22 as a web and/or software as a service (SaaS) application.

It should be understood that while the data center 24 provides the content filtering service to the client devices 22, the data center 24 runs a specialized tool 54 that scans the content which is accessed by the content filtering service for new network addresses 56 for possible addition onto the whitelist 52. In the context of browsing webpages, it should be appreciated that different users 30 may use a browsing application differently (e.g., some users may simply navigate to a few high level or front-end webpages before finishing their work, other users may attempt to click on links within the high level webpages to navigate to lower-level webpages to perform additional work, and yet other users may navigate to a large number of different varying-level webpages, and so on). During this time, the specialized tool 54 scans each webpage that is accessed by the secure browsing service for new network addresses 56 (e.g., universal resource locators or URLs) and stores results of such scanning results in a database or repository 58.

After a period of operation (e.g., after a day, after several days, after a week, since the last time the specialized tool 54 was invoked or activated, etc.), the specialized tool 54 analyzes these scanning results to determine whether one or more new network addresses 56 should be added to the whitelist 52. In particular, the specialized tool 54 retrieves the scanning results from the database 58 and scores new network addresses 56 that are no currently on the whitelist 52 (e.g., based on a predefined set of assessment criteria).

In accordance with certain embodiments, the scanning results includes input from multiple users 30 (e.g., all of the URLs across all of the users 30 of specialized application). Accordingly, the specialized tool 54 is able to identify new network addresses 56 for inclusion on the whitelist 52 based different users and/or different user behaviors (e.g., based on crowd sourcing input).

Based on the particular scoring methodology applied by the specialized tool 54, one or more new network addresses 56 may be identified for inclusion on the whitelist 52. Along these lines, the scoring methodology may be to select all new URLs (or links) that were discovered within the browsed content more than a predefined number of times (e.g., 5 times, 10 times, etc.). Alternatively, the scoring methodology may be to select all URLs that were attempted to be viewed a predefined number of times (e.g., once, twice, etc.). As another example, the scoring methodology may be to allow all URLs that reside on the public network, or on a private network, etc. Other scoring methodologies and scoring methodology combinations are suitable for use as well.

In some arrangements, the specialized tool 54 adds the identified network addresses to the whitelist 52 automatically thus providing certain advantages such as reduced response time, more efficient application of computerized resources, an improved user experience, etc. For example, the specialized tool 54 may operate periodically in the background in a manner that is transparent to the users 30 and automatically add a URL to the whitelist 52 only after the specialized tool 54 determines that at least five different users 30 have attempted to click on a link thus providing a strong indication that the users 30 are in need of access.

In other arrangements, the specialized tool 54 recommends the identified network addresses 56 for addition to the whitelist 52 (e.g., prompting a privileged human administrator for review/approval) thus provide certain advantages such as human safeguarding or confirmation that the network addresses 56 are safe for inclusion, an opportunity for a human to verify that the network addresses 56 are appropriate (e.g., to check that the network addresses are not confidential, not advertisements, not malicious, etc.). For example, the specialized tool 54 may display each newly detected URL that has occurred at least five times in a dialog window or pane to a human administrator to allow the human administrator to approve or not approve that URL for inclusion within the whitelist 52.

Other arrangements are suitable for use as well (e.g., automatic inclusion of recommended network addresses 56 if the human administrator has not reviewed within a certain amount of time, etc.). Further details will now be provided with reference to FIG. 2.

Figure 2:
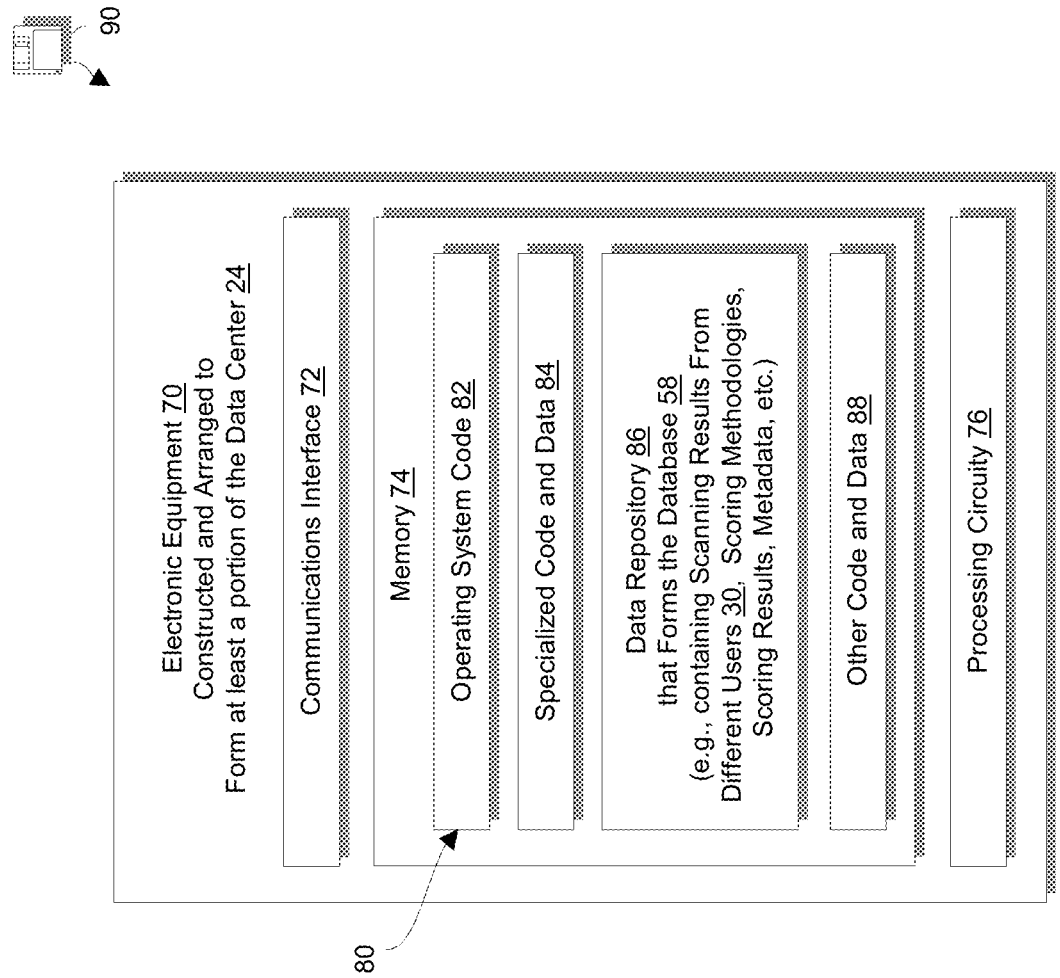
FIG. 2 is a block diagram of electronic equipment which is suitable for use within the VDI environment of FIG. 1 in accordance with certain embodiments.

FIG. 2 shows electronic equipment 70 which is suitable for use as at least a portion of the data center 24 in accordance with certain embodiments. The electronic equipment 70 includes a communications interface 72, memory 74, and processing circuitry 76.

The communications interface 72 is constructed and arranged to connect the electronic circuitry 70 to the communications medium 28 (FIG. 1). Accordingly, the communications interface 72 enables the electronic equipment 70 to communicate with the other components of the computing environment 20. Such communications may be line-based, wireless, combinations thereof, and so on. Moreover such communications may utilize a variety of protocols (e.g., IP, cellular, fiber optic, RF, etc.).

The memory 74 is intended to represent both volatile storage (e.g., DRAM, SRAM, etc.) and non-volatile storage (e.g., flash memory, magnetic disk drives, etc.). The memory 74 stores a variety of software constructs 80 including an operating system 82, specialized code and data 84, a data repository 86 containing scanning results collected from multiple client devices 22 operated by different users 30 and other information (e.g., also see the database 58 in FIG. 1), and other code and data 88. The processing circuitry 76 is constructed and arranged to operate in accordance with the various software constructs 80 stored in the memory 74. In particular, the processing circuitry 76, when executing the operating system 82, manages various resources of the electronic equipment 70 (e.g., memory allocation, processor cycles, hardware compatibility, etc.). In some arrangements, the operating system 82 includes a hypervisor that enables the electronic equipment 70 to provide a virtualization platform within which to run virtual machines (VMs).

Additionally, the processing circuitry 76 operating in accordance with the specialized code and data 84 forms specialized control circuitry to scan retrieved content for new network addresses 56, store the scanning results in the data repository 86, and then process the stored scanning results to identify new network addresses 56 for inclusion on the whitelist 52.

The data repository 86 stores scanning results (e.g., newly detected network addresses 56), scoring methodologies (e.g., rules, policies, algorithms, etc.), scoring results (e.g., occurrences/tallies, occurrences per user 30, etc.), metadata (e.g., whether the addresses were clicked on, the IP addresses for the URLs, and/or host addresses, etc.), and so on. In some arrangements, the data repository 86 includes entire browsing histories. In other arrangements, the data repository 86 includes filtered browsing histories (e.g., only new network addresses, etc.).

Furthermore, the processing circuitry 74 operating in accordance with the other code and data 88 forms other specialized circuitry such as the an application storefront, a virtual desktop server, an application server, and so on. The other code and data 88 may include information for other services as well such as databases, websites, etc. for different enterprises or for groups of users, and so on.

It should be understood that the above-mentioned processing circuitry 76 may be implemented in a variety of ways including one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic equipment 70. The computer program product 90 has a non-transitory and non-volatile computer readable medium that stores a set of instructions to control one or more operations of the electronic equipment 70. Examples of suitable computer readable storage media include tangible articles of manufacture and apparatus that store instructions in a non-volatile manner such as CD-ROM, flash memory, disk memory, tape memory, and the like.

During operation, the electronic equipment 70 manages a whitelist 52 that control access to content that is rendered by a secure browser service offered by the data center 24 (e.g., a virtual web browser that is capable of performing content filtering. Whether the secure browser service delivers access or denies access to content is based on whether the network location for that content is on the whitelist 52.

In the context of a secure browsing service, when the secure browser service receives a command from a user 30 to access content, the secure browser service checks the whitelist 52 to determine whether the network address 56 of the content is on the whitelist 52. If the network address 56 is on the whitelist 52, the secure browser service retrieves and renders the content to the user 30. However, if the network address 56 is not on the whitelist 52, the secure browser service blocks the user 30 from accessing the content. In some arrangements, the secure browsing service utilizes a separate service or authority to perform checking, and the other service or authority returns an allow response or a deny response to the secure browsing service.

Additionally, the electronic equipment 70 operates as the specialized tool 54 that updates the whitelist 52 with new network addresses 56. In particular, the electronic equipment 70 scans the content that is accessed by each user 30 and updates the database 58 with the scanning results (e.g., see the data repository 86 in FIG. 2). Then, at various times, the electronic equipment 70 evaluates the scanning results (e.g., by applying a scoring methodology) to identify new network addresses 56 for inclusion on the whitelist 52. Further details will now be provided with reference to a few example use cases.

Figure 3:
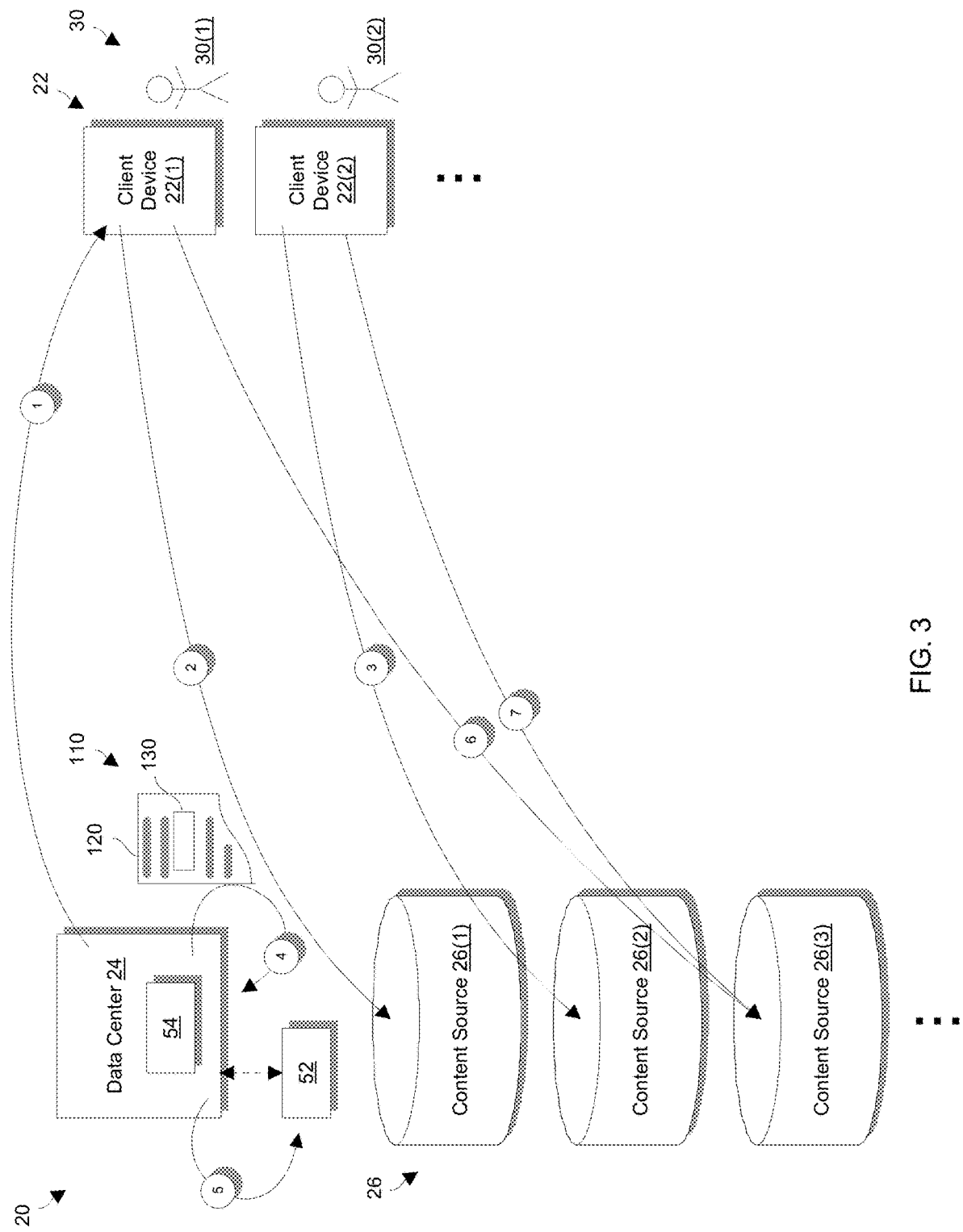
FIG. 3 is a block diagram of particular browsing related activities that occur within the VDI environment of FIG. 1 in accordance with certain embodiments.
Figure 4:
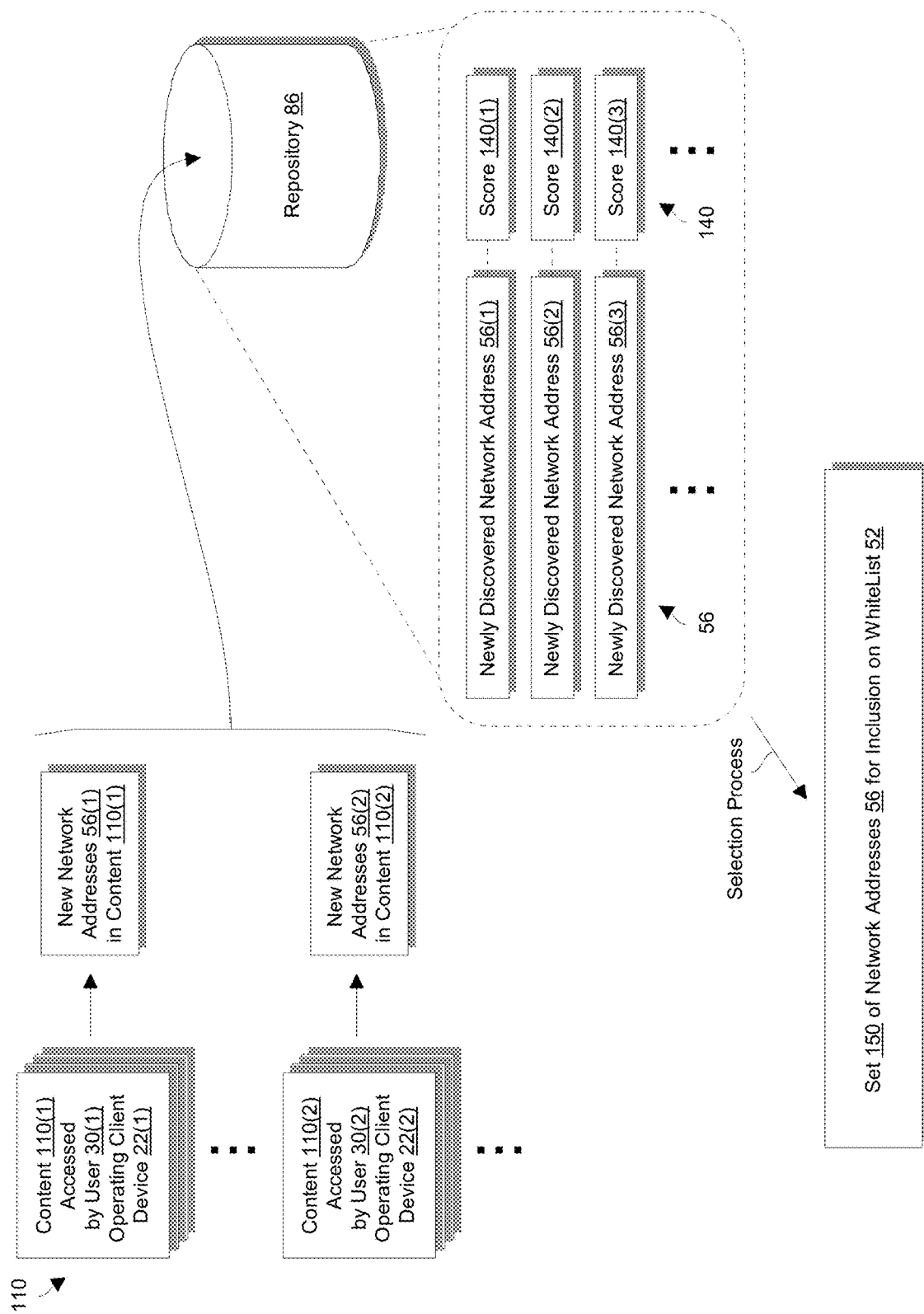
FIG. 4 is a block diagram of particular specialized tool operations in accordance with certain embodiments.

In accordance with certain embodiments, FIGS. 3 and 4 provide details regarding how a computing environment 20 (also see FIG. 1) manages a whitelist 52 which is utilized by a content filter (e.g., where a client device 22 locally runs a browser application deployed by the data center 24, or conveys user input to a secure browsing service provided by the data center 24, etc.) for access control. FIG. 3 shows a sequence of activities which occurs within the computing environment 20. FIG. 4 shows a sequence of operations for providing a set of network addresses 56 for inclusion on the whitelist 52 based on the operation of a specialized tool 54.

FIG. 3 shows the data center 24 providing a secure browser to multiple client devices 22(1), 22(2), . . . (collectively, client devices 22) which are operated by respective users 30(1), 30(2), . . . (collectively, users 30) (e.g., see arrow 1 in FIG. 3). As mentioned above, delivery of the secure browser may take a variety of forms (e.g., deployment via a storefront, access via a virtual desktop which utilizes a content filtering service run by the data center 24, combinations thereof, etc.).

The secure browser enables each user 30 to access content 110 from one or more content sources 26 over a computer network. Along these lines and as shown in FIG. 3, user 30(1) operates the client device 22(1) to access content 110 from content source 26(1) (arrow 2), user 30(2) operates the client device 22(2) to access content 110 from content source 26(2) (arrow 3), and so on.

FIG. 4 shows content 110 (e.g., web pages) accessed by each user 30. In particular, respective content 110(1) is accessed by the user 30(1) while operating the client device 22(1). Similarly, respective content 110(2) is accessed by the user 30(2) while operating the client device 22(2), and so on.

During this activity, the data center 24 runs the specialized tool 54 to identify new network addresses 56 within the content 110. In particular, the specialized tool 54 scans content that is accessed by the users 30 to identify new network addresses 56 and stores the scanning results in a database 58. The specialized tool 54 periodically evaluates the scanning results to determine whether any new network addresses 56 should be included on the whitelist 52 (see arrow 4 in FIG. 3). Along these lines, the content 110 (FIG. 3) may include web pages 120 that include sections 130 having links (e.g., URLs) which may or may not have been clicked on. Nevertheless, the specialized tool 54 scans each web page 130 for network addresses 56 to discover new network addresses 56 that are not currently on the whitelist 52. Such webpage sections 130 may be panes, windows, and/or main web page regions which display links and/or attempt to retrieve further content. In some arrangements, the specialized tool 54 processes the web page source code to identify links.

It should be appreciated that such activity may be viewed as a crowdsourcing approach to identifying new network addresses 56 since the results are based on browsing activity by multiple users 30. That is, the specialized tool 54 scans the 110(1) accessed by user 30(1) to identify new network addresses 56(1), the 110(2) accessed by user 30(2) to identify new network addresses 56(2), and so on (FIG. 4).

The scoring methodology may take a variety of forms and may be customizable/changeable (e.g., via input from a human IT administrator). In particular, the specialized tool 54 applies a particular scoring methodology to the scanning results in the database 58 (also see FIGS. 1 and 2) to determine which of the newly discovered network addresses 56 should be included within the whitelist 52 and which of the newly discovered network addresses 56 should be omitted from the whitelist 52. For each new network address 56, the specialized tool 54 provides a respective score 140 for each newly discovered network addresses 56 (e.g., a score 140(1) for network address 56(1), a score 140(2) for network address 56(2), a score 140(3) for network address 56(3), and so on).

The specialized tool 54 then identifies a set 150 of new network addresses 56 for inclusion on the whitelist 52 (arrow 5 in FIG. 3). The inclusion of such a set 150 of new network addresses 56 (FIG. 4) may be performed automatically or require approval from an IT administrator.

For example, in a simple arrangement, the specialized tool 54 counts (or tallies) the number of occurrences of each newly discovered network address 56 and uses such counts as the scores 140. Such a counting operation may be performed at the end of some period of time (e.g., daily, weekly, in response to a command after operating for some time, etc.) or even dynamically in real time (e.g., via running totals). The specialized tool 54 then performs a selection process by filtering or sorting the newly discovered network addresses 56 based on the scores 140 to identify a set 150 of network addresses 56 for inclusion on the whitelist 52. In some situations, the specialized tool 54 may automatically include on the whitelist 52 any network addresses 56 which occurred more than a predefined number of times within the content 110 (e.g., five times, 10 times, etc.). In other situations, the specialized tool 54 may present the network addresses 56 to an IT administrator in a ranked order and prompt the IT administrator to provide input on whether to include or omit each network address 56.

As another example, the specialized tool 54 may compute or calculate scores 140 for the network addresses 56 using different weights. Along these lines, if a user attempts to access a particular network address 56 (e.g., by clicking on a link), the specialized tool 54 may consider that event to be 2× or 3×, etc. as significant as simply finding a network address 56 which is not clicked on. Again, after a period of time, the specialized tool 54 performs a selection process by ranking the newly discovered network addresses 56 based on their corresponding scores 140 for inclusion on the whitelist 52 (e.g., where any newly discovered network addresses 56 having a score 140 that exceeds a predefined threshold is recommended for inclusion on the whitelist 52). In some arrangements, the specialized tool 54 selects the N highest ranked network addresses 56 or the N network addresses 56 with the highest number of occurrences for whitelist inclusion (e.g., where N is 1, 3, 5, and so on).

Other scoring techniques are suitable for use as well. For example, the specialized tool 54 may keep multiple tallies for each newly discovered network addresses 56, i.e., one tally for the number of occurrences within the content 110 and another tally for the number of times that network addresses 56 was clicked on, etc. As another example, the specialized tool 54 can computer different scores 140 based on whether the network addresses 56 are on a public network or private network, whether the network addresses are found on a blacklist, based on the length of the URLs, and so on.

It should further understood that it is not necessary for the specialized tool 54 to identify network addresses 56 for inclusion on the whitelist 52 in real time. Rather, in certain arrangements, the specialized tool 54 stores navigation data within a repository (or log) 86 in the data center 24. Then, in response to an event (e.g., based on a command, when invoked, periodically, etc.), the specialized tool 54 retrieves the navigation data from the repository 86, generates the scores 140, and selects the set 150 of network addresses 56 for inclusion on the whitelist 52.

After the specialized tool 54 includes at least some newly discovered network addresses 56 on the whitelist 52, the secure browser is able to grant access to content from a new content source 26 (FIG. 1) at the new network address 56. For example, FIG. 3 shows that the client device 22(1) is now able to access content 110 from a new content source 26(3) (arrow 6) and similarly the client device 22(2) is now able to access content 110 from the new content source 26(3) (arrow 7) in response to inclusion of the network address 56 for the content source 26(3) on the whitelist 52.

It should be understood that the above-described improvements are well suited for a variety of use cases. A few example use cases will now be described.

In a first example use case, suppose that Company A has recently acquired Company B and that the employees of Company B needs to be onboarded with Company A. In particular, suppose that a human IT administrator of Company A is now tasked with providing access to various applications/resources of Company A. Along these lines, Company A may manage various projects using a web-based project management tool that collects project issues, organizes project tasks, manages project workflows, and provides project reporting. An example of a similar tool is Jira Software which is provided by Atlassian of Sydney, Australia.

Here, the IT administrator of Company A understands that it would not be a good practice to allow the employees (e.g., see users 30 in FIG. 1) of Company B to have immediate access to all of the computer resources of Company A from a security perspective (e.g., perhaps the employees of Company B do not yet know which information is company confidential, have not been fully informed on Company A's policies, have not completed proper training, etc.). Accordingly, the IT administrator of Company A uses the above-described secure browser and publishes a web application with a limited whitelist configured.

That is, the IT administrator is able to initially add the appropriate network locations (e.g., links) used by the project management tool to the whitelist 52 and then direct the specialized tool 54 to identify new network locations 56 that should be added to the whitelist 52. In response the specialized tool 54 may see that the employees read defect descriptions, comments, blogs, etc. which include embedded links to further information (i.e., additional content at other content sources 26). Accordingly, the specialized tool 54 scans content accessed by the employees of Company B and recommends new network addresses 56 to the other content sources 26 such as those to a file sharing site, a sharepoint location, and so on.

In a second use case example, suppose that an organization hires outside contractors to help on a large project. In such a situation, the IT administrator of the organization may not know all of the content sources 26 (FIG. 1) that are needed by the contractors.

In this second use case example, the IT administrator enters an initial set of network addresses 56 on to the whitelist 52 and then directs the specialized tool 54 to provide an list of new network locations that should be added to the whitelist 52.

In a third use case example, suppose that a corporation wishes to limit the URLs that can be accessed by employees using the corporation's virtual desktop infrastructure. Here, the IT administrator may wish to prevent the employees from distractions such as online shopping websites, advertisements, etc.

In this situation, the IT administrator only includes work-related network locations 56 on the whitelist 52. Here, the computing environment 20 operates as a corporate Internet filter. Accordingly, the employees of the corporation can only access the work-related network locations 56 using the corporate equipment (e.g., a virtual desktop infrastructure).

Figure 5:
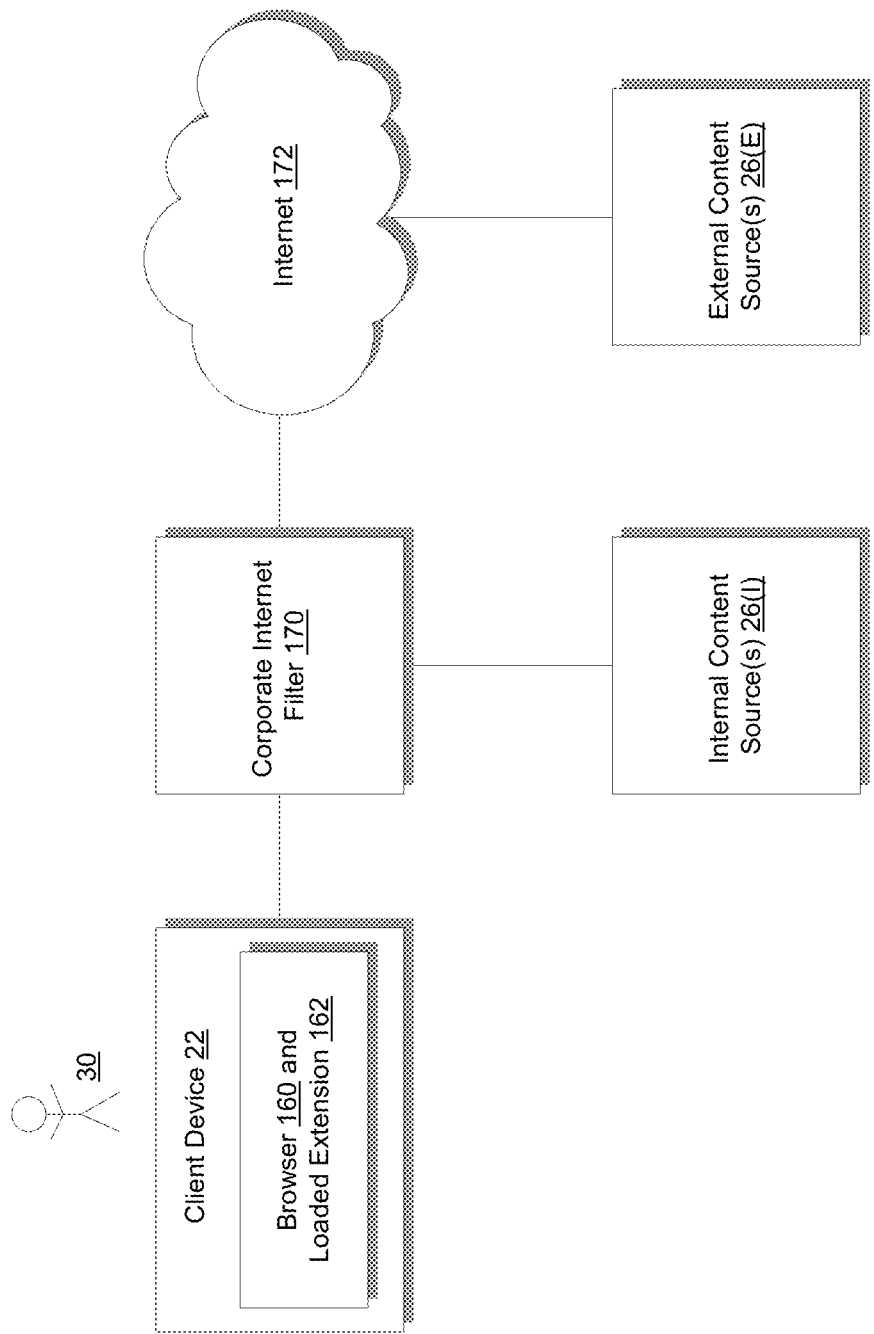
FIG. 5 is an example use case in accordance with certain embodiments.

In another example and as shown in FIG. 5, a user 30 operates a client device 22 having a browser 160 (e.g., an embedded or hosted browser or other client app) that accesses VDI resources (e.g., a web app or a SaaS app, a simple URL, etc.). The browser 160 is provisioned with an extension 162 such as a helper object or a browser extension module that can be loaded from an external source. The browser 160 is then able to:

a. monitor any launch of network address by the user (say entering a URL in an address bar or clicking a link), and/or
b. scan a web page to identify network addresses.

Additionally, the extension 162 can send the identified network addresses back to the VDI environment where the network addresses would get added to the database.

One should appreciate that FIG. 5 shows a more detailed topology or an alternative topology to that of FIG. 1. In particular, the VDI environment includes a corporate Internet filter 170 that connects to the Internet 172. The internal content sources 26(I) reside behind the corporate Internet filter 170, while the external content sources 26(E) are accessed through the Internet 172. In some arrangements, the extension 162 may even be deployed/loaded into the corporate Internet filter 170.

Figure 6:
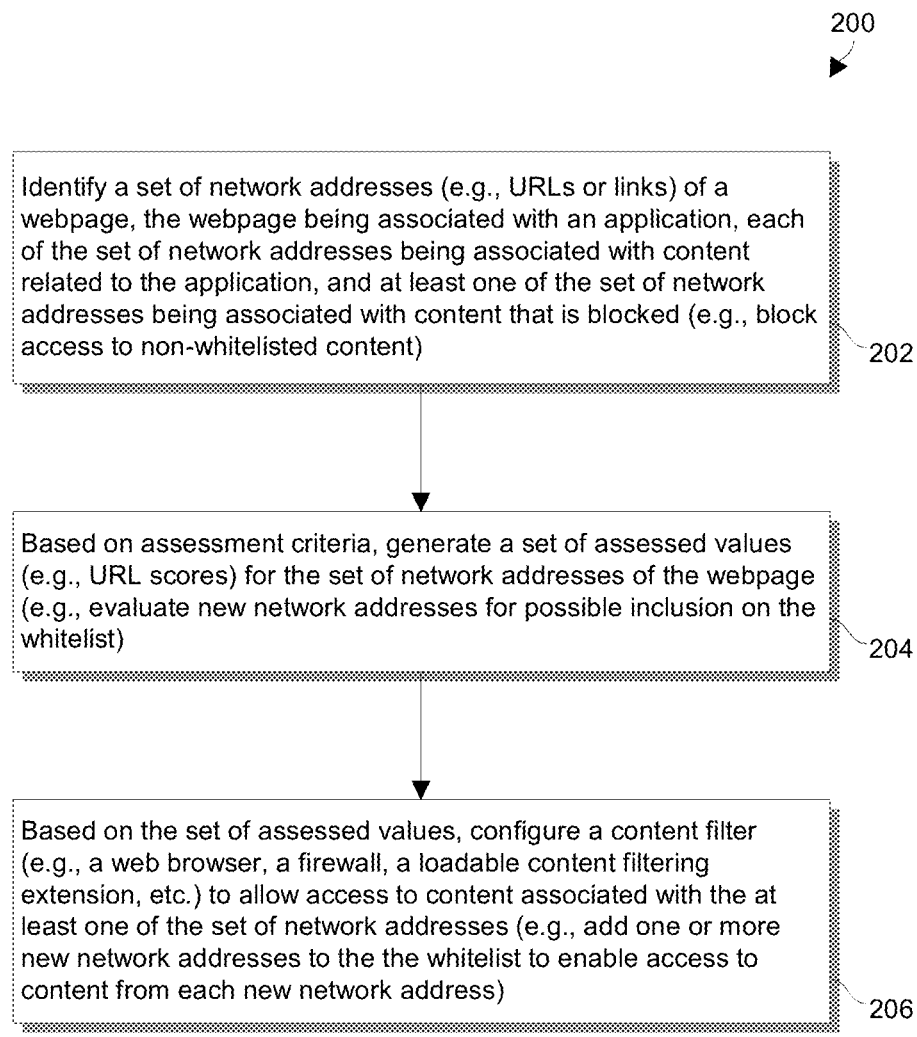
FIG. 6 is a flowchart of a procedure that is performed by the VDI environment of FIG. 1 in accordance with certain embodiments.

FIG. 6 is a flowchart of a procedure 200 for providing access to content within a computing environment in accordance with certain embodiments. In accordance with some embodiments, such a procedure 200 may be performed by computerized circuitry in a manner which is transparent to users that are accessing content using a content filtering service within a VDI environment.

At 202, the computerized circuitry identifies a set of network addresses of a webpage, the webpage being associated with an application (e.g., a web-based project management tool). Each network address is associated with content related to the application, and at least one of the set of network addresses is associated with content that is blocked. Along these lines, the computerized circuitry blocks access to non-whitelisted content (i.e., content from content sources that are not listed on the whitelist).

At 204, the computerized circuitry generates a set of assessed values for the set of network addresses of the webpage based on assessment criteria. Along these lines, a specialized tool 54 evaluates (e.g., orders, ranks, selects, etc.) new network addresses for possible inclusion on the whitelist 52.

At 206, the computerized circuitry configures a content filter to allow access to the content associated with the at least one of the set of network addresses based on the set of assessed values. Along these lines, one or more new network addresses is added to the whitelist thus enabling access to content from each new network address.

As described above, improved techniques are directed to providing access to content within a computing environment. In accordance with certain embodiments, a user 30 is able to operate a secure browser which is configured to allow access only to content from specified network addresses 56 (e.g., URLs or links within webpages) on a whitelist 52 (e.g., a list of permitted network addresses 56). If the user 30 directs the secure browser to access content from a network address 56 that is not on the whitelist 52, the secure browser 56 blocks access to that content. As the user 30 navigates the secure browser through content, a specialized tool 54 (e.g., specialized circuitry formed by one or more processors operating in accordance with specialized instructions) identifies new network addresses 56 within that content and evaluates these newly identified network addresses as candidates for possible inclusion on the whitelist 52. In some arrangements, the specialized tool 54 may detect new network addresses 56 within content accessed by multiple users and may perform assessments on whether these new network addresses 56 should be added to the whitelist 52 (e.g., based on how many times the network addresses 56 were detected, whether the users 30 attempted to access content from the detected network addresses 56, whether the network addresses 56 are on a public or private network, etc.). Accordingly, a human administrator does not need to wait for users to request addition of new network addresses 56 to the whitelist 52 in order to access content from the new network addresses 56. Rather, the specialized tool 54 is able to detect network addresses 56 even before the users 30 have attempted access thus enabling proactive updating of the whitelist 52.

Additionally, one should appreciate that the above-described techniques amount to more than simply providing performing routine tasks using a computer. Rather, the techniques involve an improvement to the technology of managing a whitelist 52 which is used for accesses control where network addresses 56 may be provided for whitelist inclusion even if the network addresses 56 have not been selected (e.g., clicked on). Such proactive operation eliminates wasted resources that would otherwise be consumed in a reactive iterative approach where users try to access network addresses 56 and then request inclusion of network addresses 56 each time their attempts fail. Furthermore, such operation reduces latency in updating the whitelist 52 which controls the content filter with new network locations.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data center 24 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Furthermore, it should be understood that applications other than a secure browser can be controlled via a whitelist 52. Examples of other suitable specialized applications that control access based on such a whitelist 52 include a firewall, a blogging application, a virtualized front-end database application, virtualized media players, specialized graphical user interfaces (GUIs), other web and software as a service (SaaS) applications that need to securely access content, and so on.

Additionally, it should be appreciated that the above-described improvements provide various flexibility and advantages such as, when two entities A and B merge, the whitelist of A and the white list of B can be combined. Accordingly, the resulting whitelist enables A and B to access each other's URLs but can preserve existing restrictions such as continuing to deny access to other URLs. Other scenarios are available as well such as B simply adding A's whitelist to B's whitelist, or vice versa.

Furthermore, it should be understood that types of network addresses 56 other than URLs are suitable for use by the above-mentioned improvements. Such other types of network addresses 56 include long links, short links, numerical IP addresses, pathnames, device names, unique equipment identifiers, other URL schema, combinations thereof, and so on. Such modifications and enhancements are intended to belong to various embodiments of the disclosure.

What is claimed is:

1. A method comprising:
   omitting, from a whitelist that controls operation of a content filter, a network address to a resource to block access to the resource due to operation of the content filter;
   identifying the network address to the resource which is currently blocked from being accessed via the network address due to operation of the content filter;
   identifying occurrences of the network address within previously accessed content;
   based on the occurrences of the network address within the previously accessed content, modifying the operation of the content filter to unblock access to the resource via the network address by adding the network address to the whitelist; and
   after the operation of the content filter is modified to unblock access to the resource via the network address, permitting access to the resource via the network address by enabling the whitelist to continue to control operation of the content filter, the resource being webpage content, wherein permitting access to the resource includes delivering, via a browser running in a virtual desktop, new content while a virtualization platform operates the content filter to block the browser running in the virtual desktop from accessing other resources.

2. A method as in claim 1 wherein identifying the network address to the resource includes:
   detecting a plurality of network addresses within the previously accessed content, the network address being among the plurality of network addresses.

3. A method as in claim 2 wherein detecting the plurality of network address within the previously accessed content includes:
   scanning browsed webpages for links within the browsed webpages, the links identifying resources which are currently blocked due to operation of the content filter.

4. A method as in claim 2 wherein detecting the plurality of network address within the previously accessed content includes:
   in response to different virtual desktop users running browsers in virtual desktops hosted by a virtualization platform, examining browsed webpages accessed by the browsers for links within the browsed webpages.

5. A method as in claim 1 wherein modifying the operation of the content filter includes:
   in response to selecting the network address from network addresses within the previously accessed content, transitioning the content filter from blocking access to the resource via the network address during a first time to allowing access to the resource via the network address during a second time after the first time.

6. A method as in claim 5 wherein transitioning the content filter from blocking access to the resource to allowing access to the resource includes:
   adding an entry containing the network address to a whitelist which stores network addresses, the content filter being constructed and arranged to unblock access to resources via entries containing networked addresses stored on the whitelist.

7. A method as in claim 5 wherein respective scores are associated with the network addresses; and
   wherein modifying the operation of the content filter further includes:
      prior to transitioning the content filter from blocking access to the resource to allowing access to the resource, selecting the network address from the network addresses based on the respective scores associated with the network addresses.

8. A method as in claim 7 wherein modifying the operation of the content filter further includes:
   prior to selecting the network address, deriving the respective scores associated with the network addresses based on how often the network addresses occurred within the previously accessed content.

9. A method as in claim 7 wherein the respective scores associated with the network addresses indicate respective amounts assessed significance for the network addresses based on application of a scoring methodology; and
   wherein selecting the network address from the network addresses includes:
      choosing, for inclusion on a whitelist, the network address with most assessed significance among the network addresses.

10. A method as in claim 1 wherein
    the new content was previously blocked from being accessed via the network address due to operation of the content filter.

11. A method as in claim 10 wherein
    the virtual desktop is hosted by the virtualization platform.

12. Electronic circuitry, comprising:
a communications interface constructed and arranged to connect to a computer network;
memory; and
control circuitry coupled to the communications interface and the memory, the memory storing instructions that, when carried out by the control circuitry, cause the control circuitry to perform a method of:
omitting, from a whitelist that controls operation of a content filter, a network address to a resource to block access to the resource due to operation of the content filter,
identifying the network address to the resource which is currently blocked from being accessed via the network address due to operation of the content filter,
identifying occurrences of the network address within previously accessed content,
based on the occurrences of the network address within the previously accessed content, modifying the operation of the content filter to unblock access to the resource via the network address by adding the network address to the whitelist, and
after the operation of the content filter is modified to unblock access to the resource via the network address, permitting access to the resource via the network address by enabling the whitelist to continue to control operation of the content filter, the resource being webpage content,
wherein permitting access to the resource includes delivering, via a browser running in a virtual desktop, new content while a virtualization platform operates the content filter to block the browser running in the virtual desktop from accessing other resources.

13. Electronic circuitry as in claim 12 wherein identifying the network address to the resource includes:
detecting a plurality of network addresses within the previously accessed content, the network address being among the plurality of network addresses.

14. Electronic circuitry as in claim 13 wherein modifying the operation of the content filter includes:
in response to selecting the network address from network addresses within the previously accessed content, transitioning the content filter from blocking access to the resource via the network address during a first time to allowing access to the resource via the network address during a second time after the first time.

15. Electronic circuitry as in claim 14 wherein
the new content was previously blocked from being accessed via the network address due to operation of the content filter.

16. Electronic circuitry as in claim 14 wherein the virtual desktop is hosted by the virtualization platform.

17. A computer program product having a non-transitory computer readable medium that stores a set of instructions to provide access to content within a computing environment; the set of instructions, when carried out by computerized circuitry, causing the computerized circuitry to perform a method of:
omitting, from a whitelist that controls operation of a content filter, a network address to a resource to block access to the resource due to operation of the content filter;
identifying the network address to the resource which is currently blocked from being accessed via the network address due to operation of the content filter;
identifying occurrences of the network address within previously accessed content;
based on the occurrences of the network address within the previously accessed content, modifying the operation of the content filter to unblock access to the resource via the network address by adding the network address to the whitelist; and
after the operation of the content filter is modified to unblock access to the resource via the network address, permitting access to the resource via the network address by enabling the whitelist to continue to control operation of the content filter, the resource being webpage content, wherein permitting access to the resource includes delivering, via a browser running in a virtual desktop, new content while a virtualization platform operates the content filter to block the browser running in the virtual desktop from accessing other resources.

18. A computer program product as in claim 17 wherein identifying the network address to the resource includes:
detecting a plurality of network addresses within the previously accessed content, the network address being among the plurality of network addresses.

19. A computer program product as in claim 17 wherein modifying the operation of the content filter includes:
in response to selecting the network address from network addresses within the previously accessed content, transitioning the content filter from blocking access to the resource via the network address during a first time to allowing access to the resource via the network address during a second time after the first time.

20. A computer program product as in claim 17 wherein
the new content was previously blocked from being accessed via the network address due to operation of the content filter.

* * * * *